(12) United States Patent
Bohrer

(10) Patent No.: US 6,805,659 B2
(45) Date of Patent: Oct. 19, 2004

(54) METHOD OF MAKING ONE-PIECE LIDDED CONTAINER AND CONTAINERS MADE BY THE SAME

(75) Inventor: Timothy Bohrer, Chicago, IL (US)

(73) Assignee: Ivex Packaging Corporation, Lincolnshire, IL (US)

( * ) Notice: Subject to any disclaimer, the term of this patent is extended or adjusted under 35 U.S.C. 154(b) by 0 days.

(21) Appl. No.: 10/665,247

(22) Filed: Sep. 18, 2003

(65) Prior Publication Data

US 2004/0063557 A1 Apr. 1, 2004

Related U.S. Application Data

(62) Division of application No. 10/096,139, filed on Mar. 7, 2002.

(51) Int. Cl.[7] .................................. B31B 1/90
(52) U.S. Cl. ................. 493/102; 493/75; 493/84; 493/115; 493/169; 493/343; 493/908
(58) Field of Search ................ 493/102, 115, 493/128, 129, 133, 908, 911, 902, 167, 169, 338, 339, 341, 343, 344, 350, 75–77, 84, 85; 264/402–404, 479, 480, 248, 249; 156/308.2, 308.4, 309.6

(56) References Cited

U.S. PATENT DOCUMENTS

| | | | | |
|---|---|---|---|---|
| 3,215,450 A | * | 11/1965 | Peterson et al. ............... 281/29 |
| 3,268,381 A | * | 8/1966 | Ishikawa ..................... 156/251 |
| 3,511,433 A | * | 5/1970 | Andrews et al. ........... 220/4.23 |
| 3,519,189 A | * | 7/1970 | Bambara et al. ......... 206/521.1 |
| 3,923,237 A | * | 12/1975 | Bostrom et al. ............ 220/305 |
| 4,155,692 A | * | 5/1979 | Kermoian ................... 425/292 |
| 4,169,531 A | * | 10/1979 | Wood ......................... 206/531 |
| 4,498,589 A | * | 2/1985 | Scott et al. ................. 206/526 |
| 4,632,717 A | * | 12/1986 | Graetz et al. ............... 156/245 |
| 4,637,811 A | * | 1/1987 | Fortney ...................... 493/167 |
| 4,771,886 A | * | 9/1988 | Johnson ................. 206/387.13 |
| 4,778,439 A | * | 10/1988 | Alexander .................. 493/169 |
| 4,973,298 A | * | 11/1990 | Ferguson ..................... 493/85 |
| 5,577,989 A | * | 11/1996 | Neary ......................... 493/169 |
| 5,938,068 A | * | 8/1999 | Atkins et al. ............... 220/839 |
| 6,571,953 B2 | * | 6/2003 | Sherline et al. .......... 206/459.5 |

\* cited by examiner

Primary Examiner—Hemant M Desai
(74) Attorney, Agent, or Firm—Tracey D. Beiriger

(57) ABSTRACT

Methods of making one-piece lidded containers are described along with containers made by such methods. In one embodiment, the method entails providing a first length of thermoplastic material and a second length of thermoplastic material where a portion of the two lengths of thermoplastic material are brought into an overlapping or abutting orientation to provide a juncture of thermoplastic material. The juncture of thermoplastic material is subsequently secured. The one-piece lidded container is completed by forming a first container and a corresponding lid on the first and second lengths of thermoplastic material. Other embodiments are also described.

35 Claims, 8 Drawing Sheets

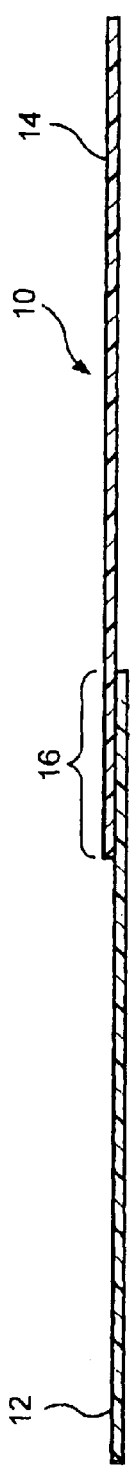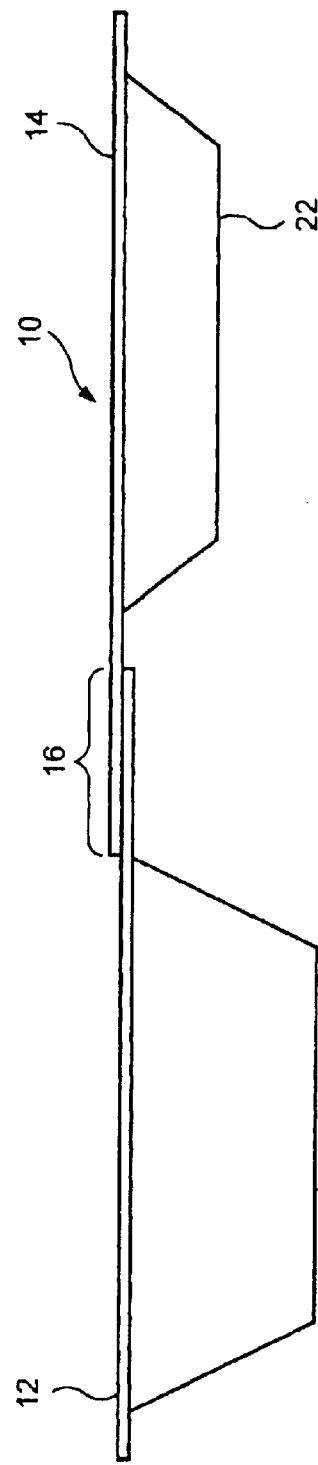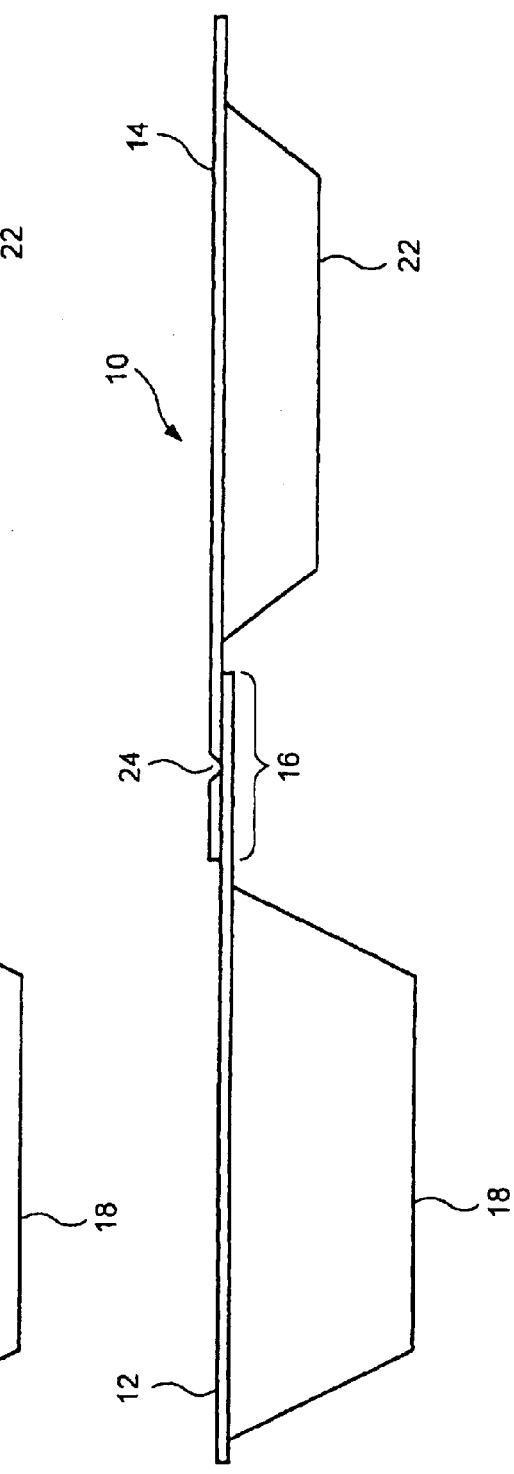

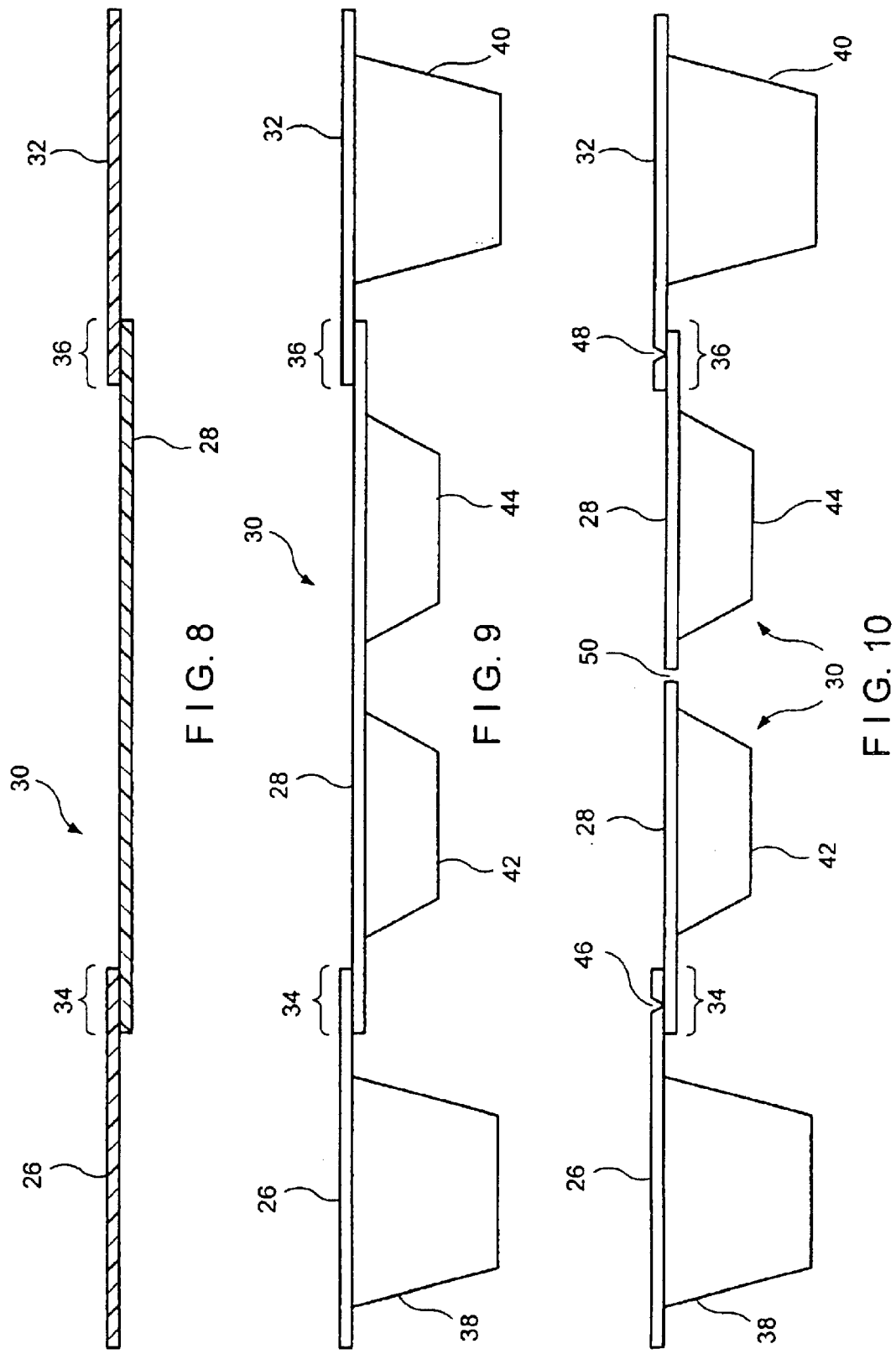

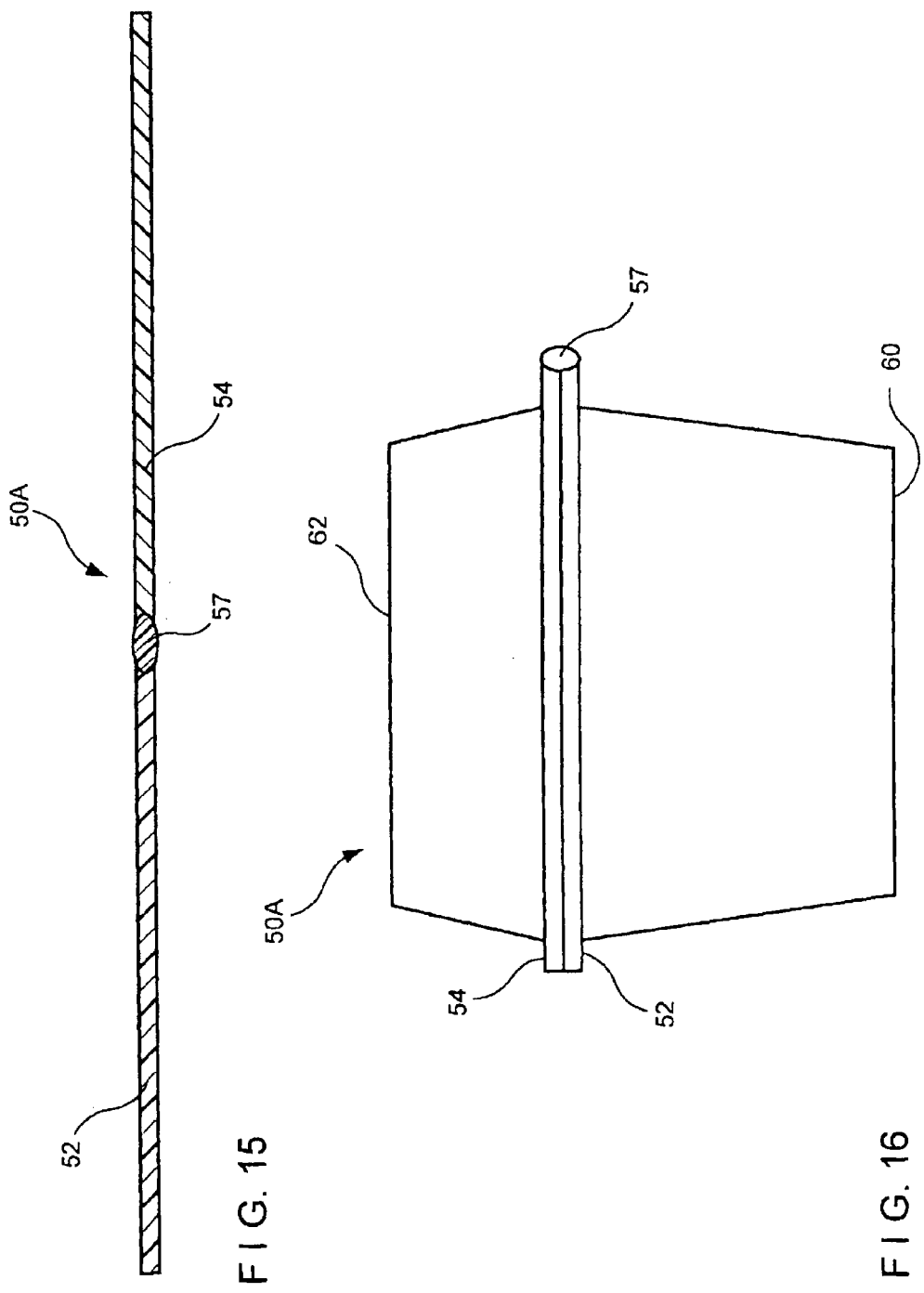

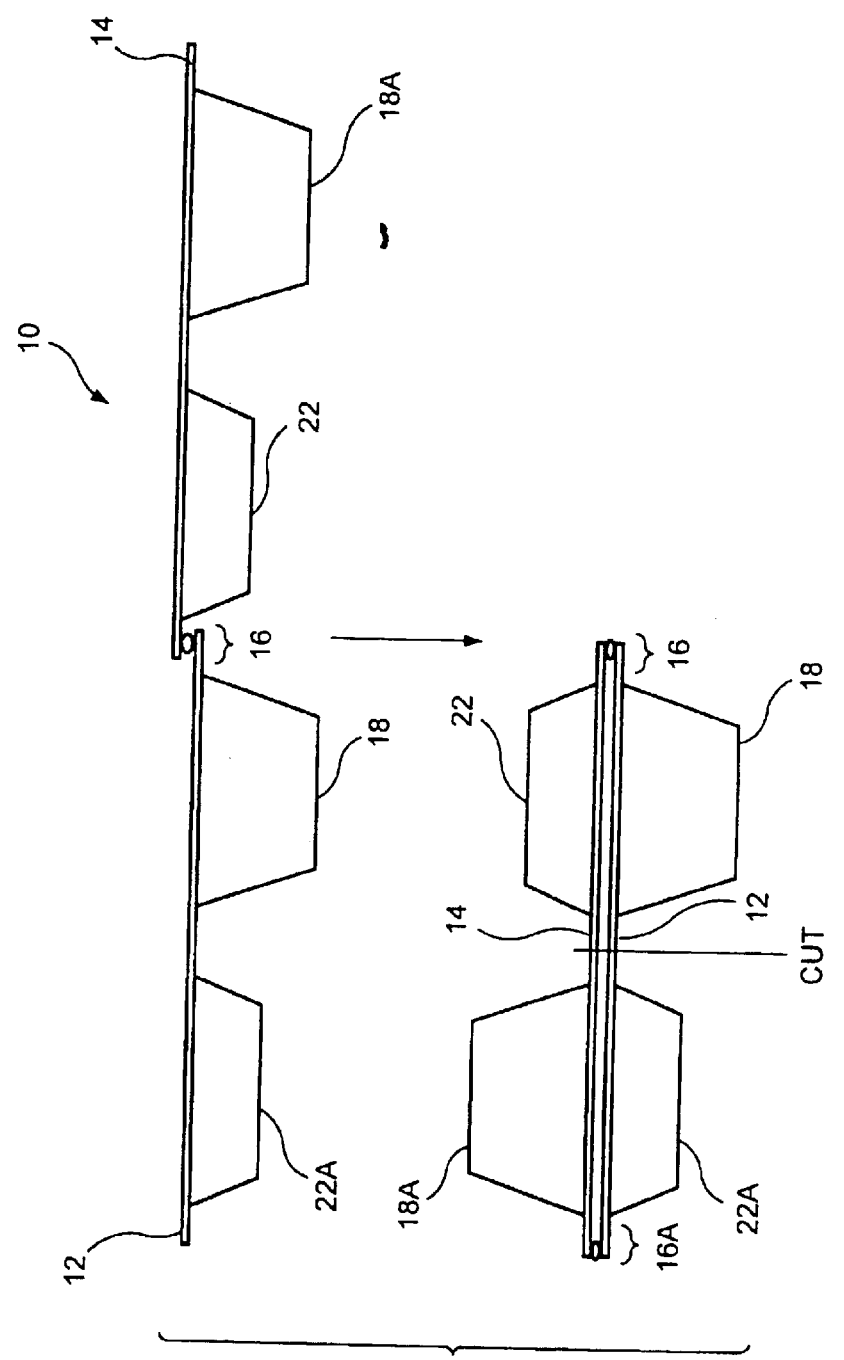

METHOD OF MAKING ONE-PIECE LIDDED CONTAINER AND CONTAINERS MADE BY THE SAME

CROSS REFERENCE TO RELATED APPLICATION

This application is a divisional of U.S. application Ser. No. 10/096,139, filed Mar. 7, 2002, entitled "Method Of Making One-Piece Lidded Container And Containers Made By The Same".

FIELD OF THE INVENTION

The present invention relates to a method of making one-piece lidded containers, and more particularly one-piece domed containers.

BACKGROUND OF THE INVENTION

One-piece lidded containers (e.g., domed or clamshell containers) are commonly used in supermarkets and other food stores to package salads, muffins, prepared foods and the like. The containers are formed by thermoforming a length of thermoplastic material to provide a bottom tray having a container structure and top tray having a corresponding lid (e.g., dome) structure. The bottom and top trays are connected by a portion of the thermoplastic material that acts as a living hinge.

For a variety of commercial applications, it would be desirable to make a one-piece lidded container of dissimilar materials and dimensions. An example of such a combination would be a one-piece lidded container of oriented and non-oriented thermoplastic material. Another example would be one-piece lidded container formed from similar or dissimilar thermoplastic materials of differing thicknesses, barrier characteristics, heat sealabilities and other differing properties. Two-piece containers are often formed from thermoplastic materials having dissimilar properties.

For other commercial applications, multiple color schemes for these types of containers are desired. One particular color scheme often used is an opaque bottom with a clear top. However, the production of such multi-hued containers is generally not feasible with bioriented thermoplastic materials, since the technique for forming such containers is to thermoform a side-by-side coextruded sheet of opaque and clear thermoplastic material. Oriented materials (e.g., oriented polystyrene) are not used since a sharp delineation is not achievable between the opaque and clear portions of the coextruded sheet once the sheet is oriented in the transverse direction. Typically, cast sheets such as poly (ethylene terephthalate) (PET) would be used for such applications.

Another solution for incorporating oriented materials into multi-hued containers is to laminate a strip of opaque oriented material onto a sheet of clear oriented material. The two layered portion of the sheet, when thermoformed, provides the opaque container structure. While this technique provides a sharp delineation between the opaque and clear portions, the technique also has its disadvantages. For example, the usage of material is inefficient since a double layer of material is used to provide an opaque section. Likewise, the use of an adhesive reduces the recyclability of scrap and trim. These disadvantages, among others, increase production costs and time.

Thus, there is a need in for a method of making one-piece lidded containers from stock material that can be dissimilar in composition and dimensions. Likewise, there is a need in the art for a method of making one-piece lidded containers with multiple color schemes that enable a sharp delineation of colored materials while at the same time optimizing usage of materials. Accordingly, it is an object of the present invention to provide such methods and one-piece lidded containers made from such methods.

SUMMARY OF THE INVENTION

The present invention provides methods of making one-piece lidded containers that facilitate optimized usage of material. In a first embodiment, the method includes providing a first length of thermoplastic material and a second length of thermoplastic material and positioning a portion of the first and second lengths to provide an overlap juncture of thermoplastic material. The first and second lengths of thermoplastic material are secured to each other at the overlap juncture preferably by different methods of sealing (heat, ultrasound etc.) or adhesive attachment. At least a first container and at least a corresponding lid are formed on the first and second lengths of thermoplastic material, respectively. The container and corresponding lid structures are preferably formed by thermoforming. Thermoplastic material to be used are oriented thermoplastic materials, non-oriented thermoplastic materials, and combinations thereof. One preferred oriented thermoplastic material is oriented polystyrene. A preferred non-oriented thermoplastic material is polyethylene terephthalate or polystyrene. The first and second lengths of thermoplastic material can have different properties such as dissimilar thicknesses, different colors, differing barrier characteristics, among others. One preferred color combination is where first length of thermoplastic material is opaque and the second length of thermoplastic material is clear. In addition, the first and second lengths of thermoplastic material are preferably each of a single-layer of thermoplastic material. A preferred structure for the corresponding lid is a dome structure. The overlap juncture of thermoplastic material is preferably positioned between the container and corresponding lid. However, as described later in some instances the overlap juncture can be incorporated into the lid or the container itself.

The method can further include providing a hinge means between the first container and the corresponding lid. In one preferred embodiment a hinge means is provided by folding the thermoplastic material at a position between the container and the corresponding lid in a direction substantially the same as the overlap juncture. Optionally, the method can provide for further scoring of the overlap juncture to facilitate folding of thermoplastic material. Other hinge means can also be provided.

In another embodiment, present invention provides a method of making one-piece lidded containers, which includes providing a first, a second and a third length of thermoplastic material. A portion of the first and second lengths of thermoplastic material are positioned to provide a first overlap juncture of thermoplastic material. Likewise, a portion of the second and third lengths of thermoplastic material are positioned to provide a second overlap juncture of thermoplastic material opposite from the first juncture. The thermoplastic material of the first and second overlap junctures, respectively, are secured by different methods of sealing or in some instances with an adhesive or sealant. At least a first container and at least a second container are formed on the first and third lengths of thermoplastic material. Similarly, at least a first corresponding lid and at least a second corresponding lid are formed on the second length of thermoplastic material. Lastly, the second length of thermoplastic material is severed between the first and second corresponding lids to provide at least two sets of one-lidded containers. The first and second containers are preferably formed at a position other than the first and second overlap junctures. Likewise, the first corresponding lid and the second corresponding lid are preferably formed on the second length of thermoplastic at a position other than the first and second overlap junctures. The first corresponding lid is preferably positioned proximal to the first container while the seocnd corresponding lid is preferably positioned proximal to the second container. Hinge means can also be provided between the containers and lids of the one-piece lidded containers.

In an alternative embodiment, a method is provided for making at least one one-piece lidded container which includes providing a first length of thermoplastic material and a second length of thermoplastic material and forming at least a first container and at least a corresponding lid on the first and second lengths of thermoplastic material, respectively. A portion of the first and second lengths of thermoplastic material are positioned to provide an overlapping juncture of thermoplastic material after the container lid is formed that allows alignment of the container and corresponding lid to later close in a axially opposing orientation. Once positioned, the thermoplastic material at the overlap juncture is secured to form the one-piece lidded container.

In another alternative embodiment, a method is provided for making one-piece lidded containers which includes providing a first, a second and a third length of thermoplastic material. At least a first container and at least a second container are formed on the first and third lengths of thermoplastic material. Likewise, at least a first corresponding lid and at least a second corresponding lid are formed on the second length of thermoplastic material. A portion of the first and second lengths of thermoplastic material is positoned to provide a first overlap juncture of thermoplastic material that allows alignment of the first container and the first corresponding lid in an axially opposing orientation upon closure. A portion of the second and third lengths of thermoplastic material is also positioned to provide a second overlap juncture of thermoplasic material opposite from the first overlap juncture and allows alignment of the second container and the second corresponding lid in an axially opposing orientation upon closure. The thermoplastic material of the first and second overlap junctures, respectively, are secured by various sealing means. Lastly, the second length of thermoplastic material between the first and second corresponding lid is severed to provide at least two sets of one-piece lidded containers.

In yet another alternative embodiment, a method is provided for making a one-piece lidded container which includes juxtapositioning a first length of thermoplastic material with a second length of thermoplastic material to provide a juncture in the form of an abutment of thermoplastic material. The abutting lengths of thermoplastic materials can be secured directly by a sealant or an adhesive bead, or by a joining strip that is attached to both thermoplastic materials in the same direction as the abutment of material. At least a first container and at least a corresponding lid are formed on the first and second lengths of thermoplastic material, respectively. Preferably, the juncture of thermoplastic materials is positioned between the first container and the corresponding lid. The same method of attaching the first and second lengths of thermoplastic materials can be used to attach the three thermoplastic materials previously indicated.

A method is also provided for making one-piece lidded container which includes providing a bottom tray which is formed from a length of thermoplastic material, and providing a top corresponding lid which is formed from a second length of thermoplastic material. The bottom tray and top lid are aligned in an axially opposing orientation to form a closed container which provides a lapping juncture of thermoplastic material from a contiguous portion of the bottom tray and top lid. The bottom and top lid are secured to each other to form the one-piece lidded container.

One-piece lidded containers produced in accordance with the above-described methods are also provided. One preferred one-piece lidded container structure includes a bottom tray formed from a first length of thermoplastic material, and a top corresponding lid formed from a second length of thermoplastic material. A secured juncture is formed from the lengths of thermoplastic material thereby allowing alignment of the bottom tray and top lid in an axially opposing orientation upon closure.

Advantageously, the present invention provides unique methods of making one-piece lidded containers and containers made by the same that allow dissimilar materials to be economically used. These and other advantages of the invention will readily apparent from the description set forth below.

BRIEF DESCRIPTION OF THE DRAWINGS

FIG. 1 is a cross-sectional view of the thermoplastic starting sheet of the present invention.

FIG. 2 is a side elevational view of the thermoplastic starting sheet shown in FIG. 1 having container and lid or dome structures thermoformed on the non-overlapping sections of the starting sheet.

FIG. 3 is a side elevational view of the thermoformed starting sheet material shown in FIG. 2 having an optional score line.

FIG. 8 is a cross-sectional view of a thermoplastic starting sheet of another embodiment of the present invention.

FIG. 9 is a side elevational view of the thermoplastic starting sheet shown in FIG. 7 having container and lidded or domed structures thermoformed on the non-overlapping section of the starting sheet.

FIG. 10 is a side elevational view of the thermoformed starting sheet shown in FIG. 8 having optional score lines and separated between the lidded container sets.

FIG. 15 is a cross-sectional view of a starting sheet of an alternative embodiment of the invention.

FIG. 16 is a side elevational view of a folded, thermoformed lidded or domed container produced with the starting sheet of FIG. 15.

FIG. 18 is a side elevational view of the thermoplastic starting sheet of FIG. 1 thermoformed to provide at least two folded, lidded or domed containers from the starting sheet.

DETAILED DESCRIPTION OF THE INVENTION

Figure 4:
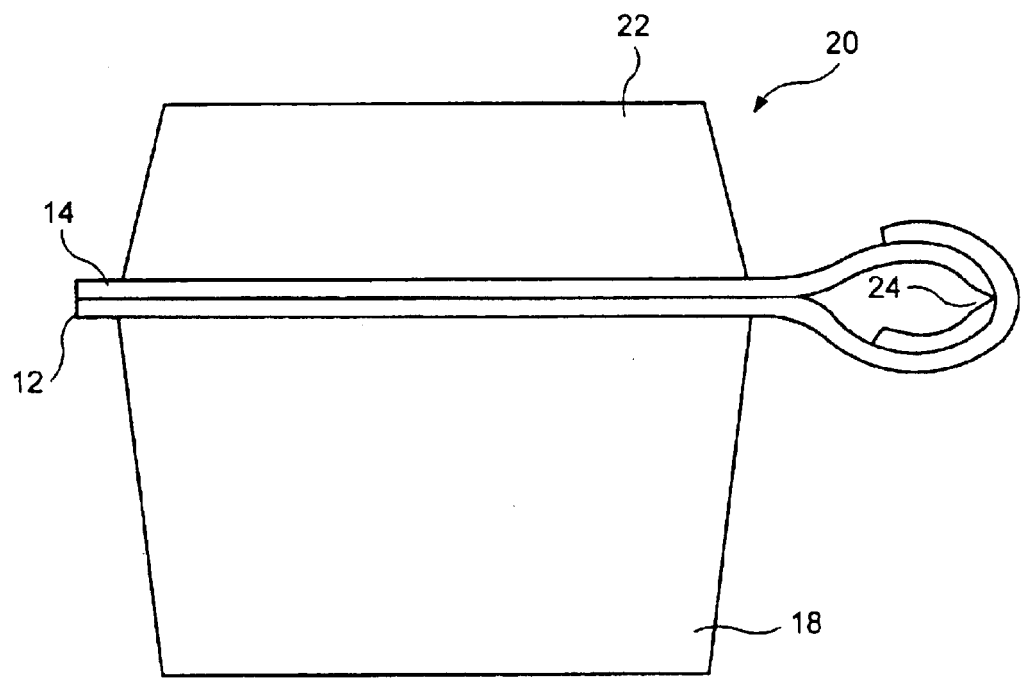
FIG. 4 is a side elevational view of a folded, thermoformed lidded or domed container with a scored, reinforced living hinge produced in accordance with one embodiment of the present invention.

Reference is now made to the drawings and in particular to FIG. 1 where a thermoplastic starting sheet 10 for producing one-piece lidded containers in accordance with the invention is shown. Starting sheet 10 is formed by positioning a portion of a first length of thermoplastic material 12 with a portion of a second length of thermoplastic material 14 in a overlapping orientation to form overlap 16. Thermoplastic materials 12 and 14 are permanently joined or secured with the use of an adhesive (or sealant) or by different methods of sealing (i.e., fusing) the thermoplastic materials. In accordance with the invention, overlap 16 can be secured in part or in its entirety. Sealing the thermoplastic material is preferred since it avoids the use of an adhesive thereby increasing the recyclability of scrap and trim. The sealing of the thermoplastic materials to each other is accomplished by any technique known in the art (e.g., heat, ultrasonic, etc.). One preferred technique for sealing thermoplastic materials is ultrasonic welding. In addition, if different thermoplastic materials are used the materials may be secured with a sealant or an adhesive compatible to both materials. Thermoplastic materials to be used are any moldable material which includes PET, polystyrene, polypropylene, high-density polyethylene, low-density polyethylene, oriented materials such as oriented polystyrene (OPS) or any combination thereof. The oriented materials can be oriented in the transverse direction, the machine direction or any combination of the two. Combinations of oriented and non-oriented materials such as OPS and PET, respectively, may also be used. In accordance with the present invention, thermoplastic materials to be used for starting sheet 10 can be formed by extrusion, casting or any combination of the two.

Referring to FIG. 2, which is a preferred embodiment, starting sheet 10 is subsequently processed to form at least a first container 18 and at least a corresponding lid (shown as dome 22) from the non-overlapping sections of starting sheet 10 so as to position overlap 16 between container 18 and dome 22. However, in accordance with the invention, starting sheet 10 can also be processed (e.g., thermoformed) to include overlap 16 in either container 18, dome 22 or both of these structures. Thus, as will be apparent to one skilled in the art, the location of the overlap of thermoplastic material in relation to the location of the container and lid structures is variable.

In accordance with the invention, starting sheet 10 with overlap 16 is preferably processed in-line with the container and lid being formed to obviate storage between process steps. The container and corresponding lid structures are also formed on the same side of the starting sheet so that when aligned in an axially opposing orientation a closed one-piece lidded container is achieved. Additional containers and lids (not shown) can be formed on starting sheet 10 adjacent to container 18 and dome 22 in a direction substantially parallel to overlap 16 to provide more than one container and lid from the starting sheet. Starting sheet 10 can then be severed between the adjacently formed containers and lids in a direction substantially perpendicular to overlap 16 to provide additional one-piece lidded containers. Alternatively, as shown in FIG. 18, additional containers and lids can be formed on the starting sheet 10 adjacent to container 18 and dome 22 in a direction substantially transverse (i.e., perpendicular) to overlap to provide additional one-piece lidded containers. Starting sheet 10 is then folded along the direction of overlap 16 and secured to provide a second overlap 16A at position opposite from overlap 16. Starting sheet 10 can then be severed between the adjacently formed containers and lids in a direction substantially parallel to overlaps 16 and 16A to provide additional one-piece lidded containers.

Moreover, in accordance with the invention, the use of the terms "container" and "corresponding lid" are merely illustrative and are thus interchangeable since they merely describe the orientation of the two halves that will ultimately form the one-piece lidded containers of the invention. As will be apparent to one skilled in the art, the position of the container and corresponding lid on the lengths of thermoplastic material can be altered (e.g., reversed) so long as the halves can be aligned in an axially opposing orientation to provide a closed one-piece lidded container.

As will be apparent to those skilled in the art, the step of severing the lengths of thermoplastic material can also be performed contemporaneously with the formation of the container and corresponding lid structures. Moreover, the step of severing can also include trimming the thermoplastic material to form the outline of the container and corresponding lid structures in addition to merely separating the one-piece lidded containers from the lengths of thermoplastic material.

In accordance with the present invention, the first and second lengths of thermoplastic material can have different properties due to differing materials, dimensions, barrier characteristics, colors and clarities for various purposes (e.g., alternating color combinations or combinations of dissimilar thicknesses). In one preferred embodiment, thermoplastic material 12 is opaque with thermoplastic material 14 being clear to provide a two tone one-piece lidded container (e.g., a domed container with an opaque bottom and clear top). Thus, a multitude of different materials may be used for one-piece lidded containers to provide dissimilar properties with respect to the container and its corresponding lid.

Figure 5:
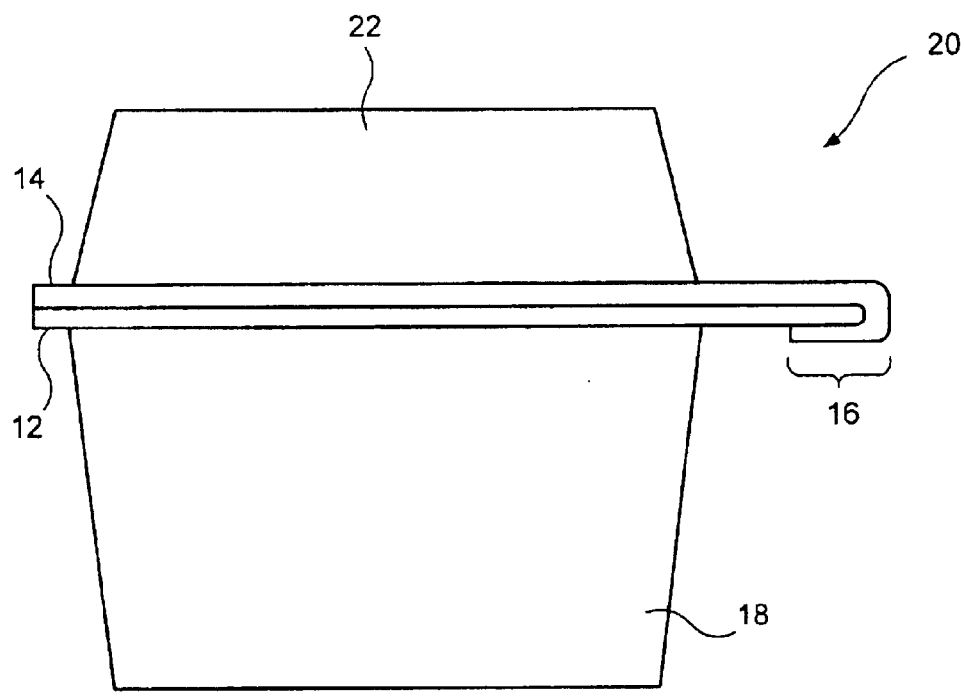
FIG. 5 is a side elevational view of a folded, thermoformed lidded or domed container with a non-reinforced living hinge produced in accordance with the present invention.
Figure 6:
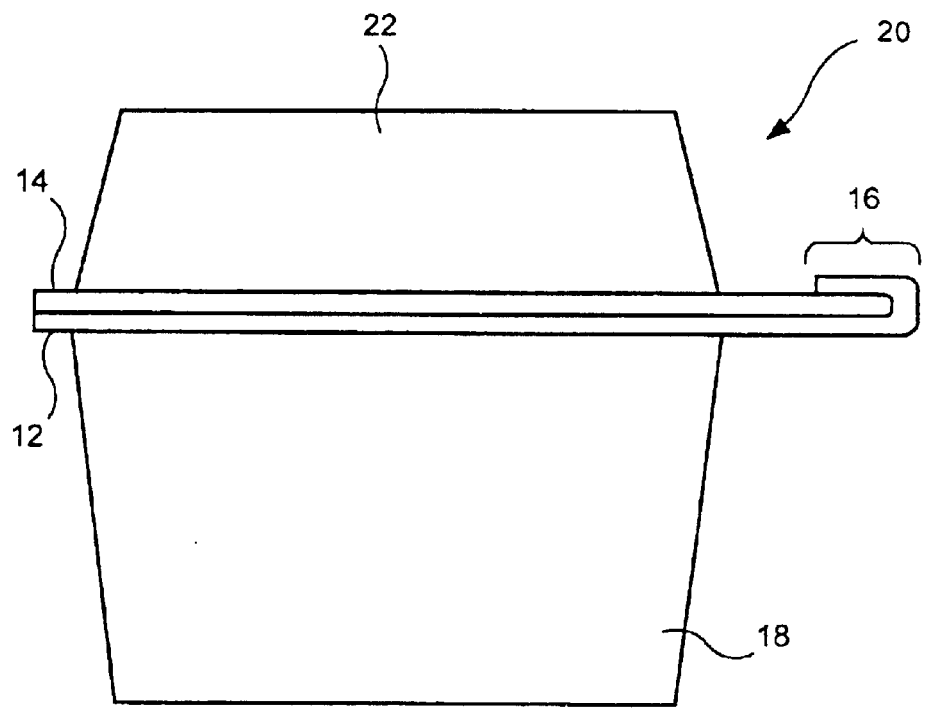
FIG. 6 is a side elevational view of another folded, thermoformed lidded or domed container with a non-reinforced living hinge produced in accordance with the present invention.
Figure 7:
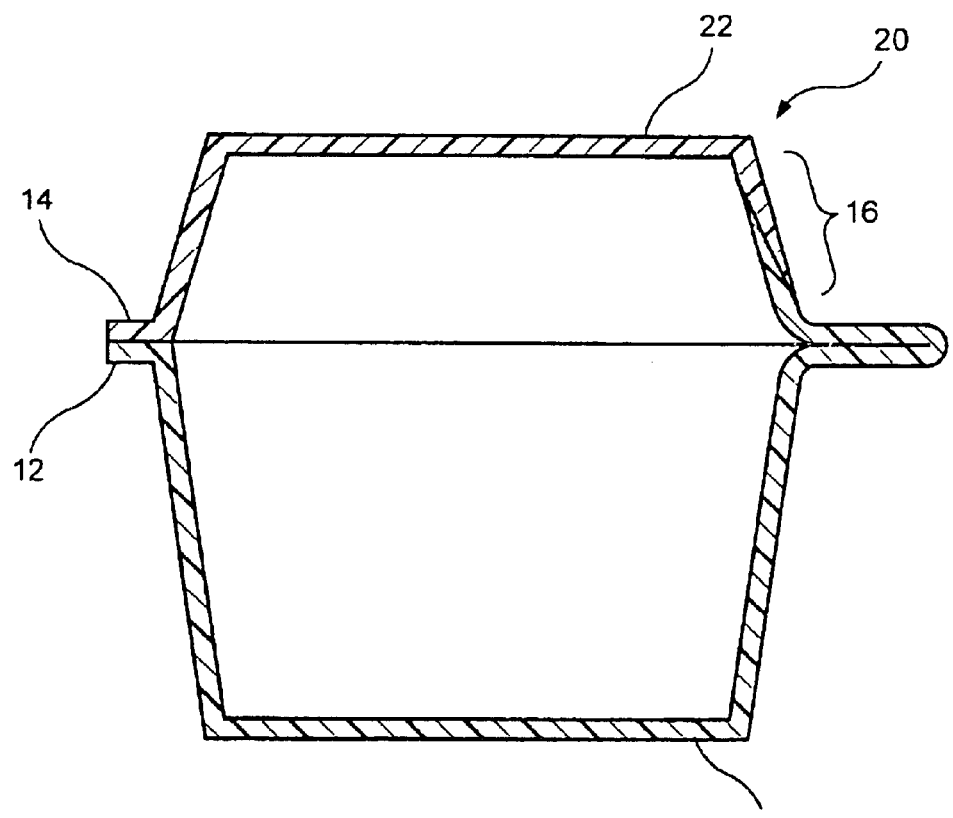
FIG. 7 is a side cross-sectional view of a folded, thermoformed lidded or domed container with the overlap juncture incorporated into the lid in accordance with the present invention.

Container 18 and dome 22 are formed using any technique known in the art. One preferred technique for forming container 18 and dome 22 is by thermoforming the thermoplastic material. Once container 18 and dome 22 are formed, starting sheet 10 is provided with a hinge means preferably in the proximity of overlap 16. For example, starting sheet 10 can be folded in substantially the same direction as overlap 16 to provide a living hinge. In one embodiment, starting sheet 10 is folded at overlap 16 to provide a reinforced living hinge for the container. In order to facilitate folding of overlap 16 a score line 24 (or other line of weakness) can be formed in substantially the same direction as overlap 16.as shown in FIG. 3. A folded, domed container 20 having a reinforced hinge is shown in FIG. 4. Folded, domed containers produced in accordance with the invention having non-reinforced hinges are also shown in FIGS. 5 and 6. Likewise, a folded, domed container 20 with a non-reinforced hinge and having overlap 16 incorporated into dome 22 is shown in FIG. 7. Thus, the containers of the present invention can be to provide a variety of hinge arrangements.

In an alternative embodiment, the first container and corresponding lid are first formed on the first and second lengths of thermoplastic material. Once the container and corresponding lid structures are formed, a portion of said container and lid formed from the first and second lengths of thermoplastic material are positioned to provide an overlap of thermoplastic material. As previously described, position of the overlap is variable. However, for ease of manufacturing it is preferably located between the container and its corresponding lid structure. Thereafter, the overlap is joined or secured using any technique known in the art to provide the starting sheet to be formed into the one-piece lidded container.

In another embodiment of the invention, as shown in FIG. 8, starting sheet 30 is formed from a first, second and third lengths of thermoplastic material 26, 28 and 32, respectively. The lengths of thermoplastic material can be the same or different as described above for starting sheet 10. Starting sheet 30 is formed by joining or securing an overlapping portion of the first length of thermoplastic material 26 with an overlapping portion of the second length of thermoplastic material 28 to form a first overlap 34. Second length 28 is also joined or secured to an overlapping portion of the third length of thermoplastic material 32 at a position opposite from first overlap 34 to form second overlap 36. The thermoplastic materials are joined or secured together in the same manner as described above. In a preferred embodiment, overlaps 34 and 36 are formed contemporaneously to reduce processing time.

Referring to FIG. 9, starting sheet 30 is subsequently processed in a manner analogous to starting sheet 10. At least a first container 38 and at least a second container 40 are preferably formed on the non-overlapping portions of first and third lengths 26 and 32, respectively. Likewise, at least a first corresponding lid (shown as dome 42) and at least a second corresponding lid (shown as dome 44) are adjacently and preferably formed on the non-overlapping portion of second length 28. Preferably, first corresponding dome 42 is proximal to first container 38 and second corresponding dome 44 is proximal to second container 40. However, in accordance with the present invention, the location of the overlaps in relation to the container and lid structures is variable. Thus, the container and lid structures can be formed to incorporate a portion or all of the overlaps in either or both structures.

Figure 11:
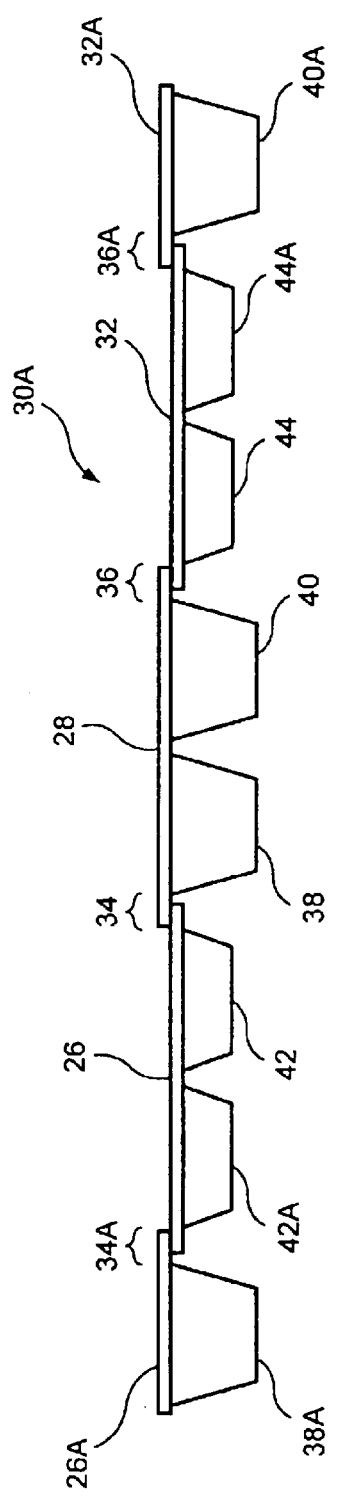
FIG. 11 is a side elevational view of the thermoplastic starting sheet of FIG. 9 modified with two additional lengths of thermoplastic material secured and thermoformed in accordance with another embodiment of the present invention.

As shown in FIG. 10, starting sheet 30 is severed at a position 50 between first and second corresponding domes 42 and 44 in substantially the same direction as overlaps 34 and 36 to provide at least two one-piece lidded (i.e., domed) containers. Alternately to provide more than two sets of lidded containers at one time, five (5) separate lengths of thermoplastic materials may be used and secured as in FIG. 11. As shown in FIG. 11, starting sheet 30A is formed in the same manner as starting sheet 30 with additional fourth and fifth lengths of thermoplastic material (26A, 32A) being secured to first and third lengths 26 and 32, respectively, at positions opposite from overlaps 34 and 36. First length 26 is secured to fourth length 26A at overlap 34A in any manner as previously described. Likewise, third length 32 is secured to fifth length 32A at overlap 36A in any manner as previously described. Additional containers 38A and 40A and domes 42A and 44A are also formed. Thereafter, starting sheet 30A is severed at three positions (between 42 and 42A, between 38 and 40, and between 44 and 44A) to provide at least four (4) one-piece lidded containers. As will be apparent to one skilled in the art, the position of containers 38 and 40 on starting sheet 30A is the reverse as found in starting sheet 30.

The one-piece containers can be provided with a variety of hinge means preferably in the proximity of overlaps 34 and 36. For example, overlaps 34 and 36 can be folded in substantially the same direction as overlaps 34 and 36 to provide a living hinge. In one embodiment, the containers are folded at overlaps 34 and 36 to provide a reinforced, living hinge. Score lines 46 and 48 can also be formed on overlaps 34 and 36 to facilitate forming of the reinforced, living hinge. Other alternative hinge arrangements can be provided as depicted in FIG. 5 and FIG. 6.

In a manner analogous to starting sheet 10, additional containers and lids (not shown) can be formed on starting sheet 30 adjacent to containers and corresponding domes 38, 40, 42 and 44 in substantially the same direction of overlaps 34 and 36 to provide more than two one-piece lidded containers from the starting sheet. The starting sheet can then be severed between the adjacently formed containers and lids (e.g., domes) in a direction substantially perpendicular to overlaps 34 and 36 to provide additional one-piece lidded containers. Likewise, for various purposes, at least one of the first, second or third lengths of thermoplastic material can be different from the other lengths of thermoplastic materials in terms of composition, dimensions, color or clarity. In one particular embodiment the first and third lengths of thermoplastic material are opaque while the second length of thermoplastic material is clear thereby providing one-piece lidded containers with an opaque bottom and a clear top.

In an alternative embodiment, the first and second containers and the first and second corresponding lids are first formed on the first, second and third lengths of thermoplastic material. Once the containers and corresponding lids are formed, a portion of the first set of lids and containers is positioned to provide a first overlap of thermoplastic material, with the first overlap preferably being located between the first container and the first corresponding lid. Likewise, a portion of the second set of lid and containers is positioned to provide a second overlap of thermoplastic material opposite from the first overlap, with the second overlap being located between the second container and second corresponding lid. The first and second overlaps are joined or secured using any technique known in the art. Thereafter, the second length of formed thermoplastic material is severed between the first and second corresponding lids to provide two sets of one-piece lidded containers.

Figure 12:
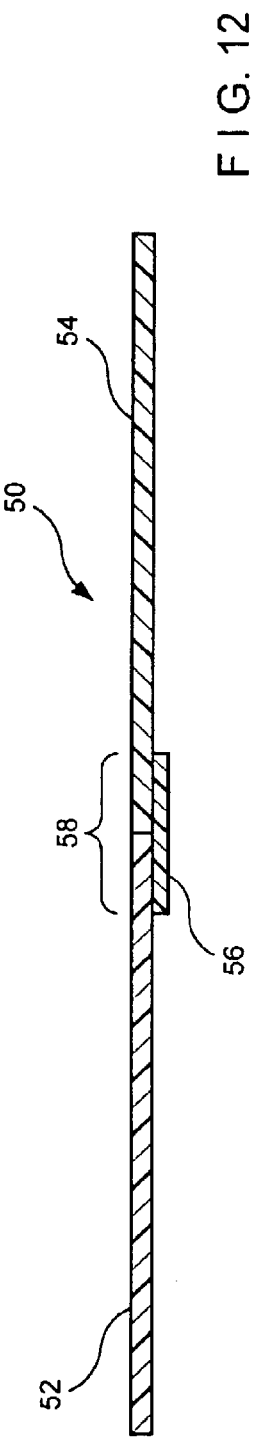
FIG. 12 is a cross-sectional view of a thermoplastic starting sheet of an alternative embodiment of the present invention.

In another embodiment of the invention, as shown in FIG. 12, starting sheet 50 is formed by juxtapositioning an edge of a first length of thermoplastic material 52 to an edge of a second length of thermoplastic material 54. A joining strip 56 is secured adjacent to the abutment of the first and second lengths 52 and 54 to provide juncture 58. Joining strip 56 is secured to the juxtaposed thermoplastic materials 52 and 54 through the use of an adhesive (or sealant) or by sealing as previously described. Joining strip 56 is of any suitable material that can be joined to the thermoplastic materials. The exact choice of material to be used as joining strip 56 is variable. Preferably, joining strip 56 is of a thermoplastic material, that is compatible with each of the first and second thermoplastic materials. The same method used in securing two thermoplastic sheets can be used to secure three thermoplastic sheets as preciously indicated. However in this case also an additional sealing station may be needed. The placement of joining strip 56 in relation to the lengths of thermoplastic material is also variable. As shown in FIG. 12, joining strip 56 is positioned below first and second lengths 52 and 54. However, the position of joining strip 56 can easily be reversed (i.e., positioned above first and second lengths 52 and 54).

Figure 13:
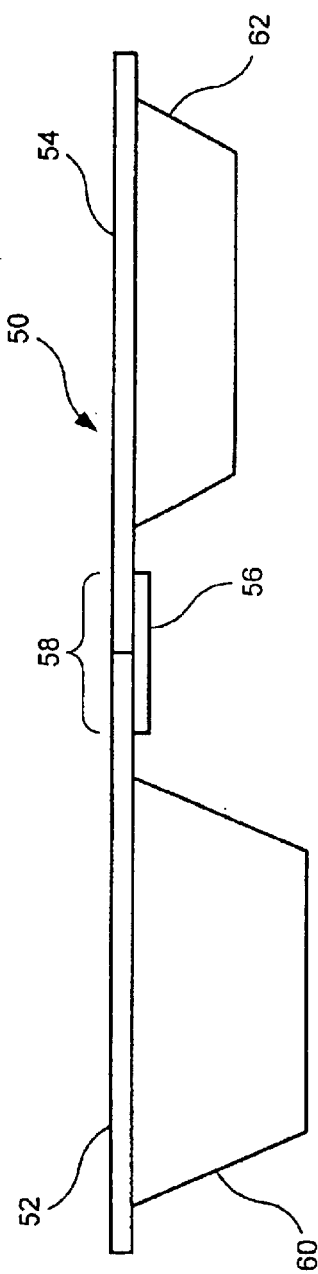
FIG. 13 is a side elevational view of the starting sheet shown in FIG. 10 having thermoformed container and domed structures.
Figure 14:
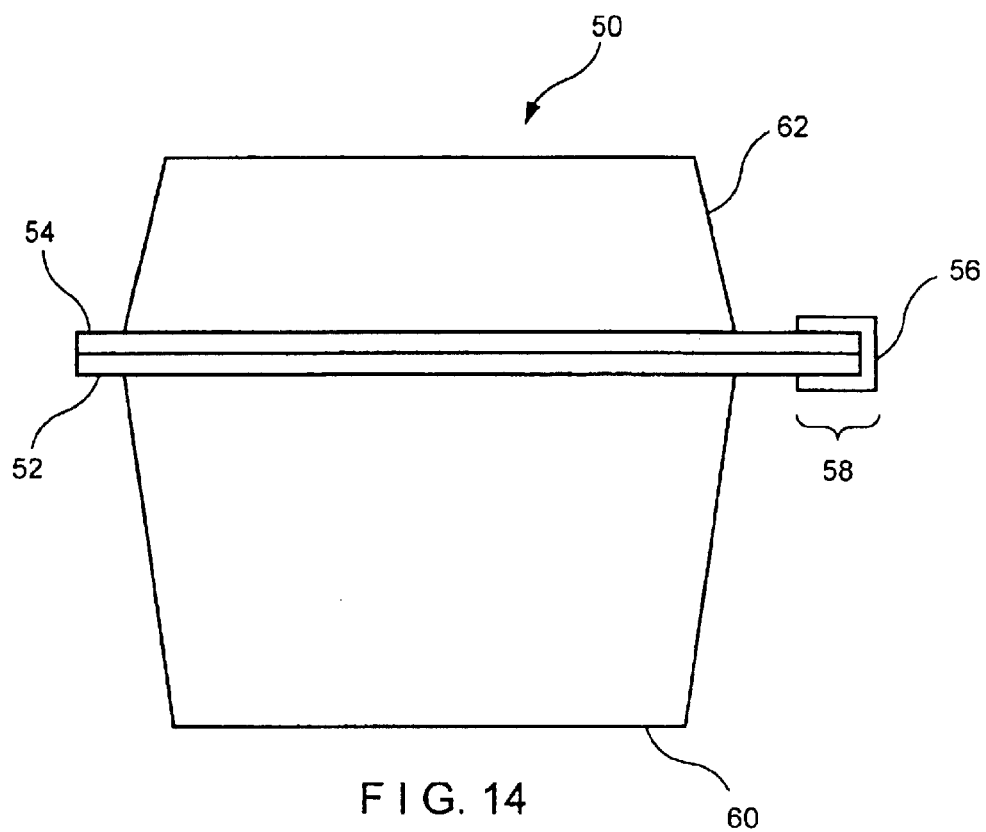
FIG. 14 is a side elevational view of a folded, thermoformed lidded or domed container produced in accordance with the alternative embodiment of the present invention.

Referring to FIG. 13, starting sheet 50 is subsequently processed to form at least a first container 60 and at least a corresponding lid (shown as dome 62). Container 60 and dome 62 are preferably thermoformed. In accordance with the invention, the location of juncture 58 in relation to container 60 and dome 62 is variable. In a preferred embodiment, as shown in FIG. 13, container 60 and dome 62 are formed from thermoplastic materials 52 and 54, respectively, at a position outside of juncture 58. Once container 60 and dome 62 are formed starting sheet 50 is folded to provide a hinge means preferably in the proximity of juncture 58. For example, starting sheet 50 can be folded in substantially the same direction juncture 58. In one embodiment, starting sheet 50 is folded at juncture 58 to provide a living hinge as shown in FIG. 14. Additional containers and lids (not shown) can be formed on starting sheet 50 adjacent to container 60 and dome 62 in the direction of joining strip 56 to provide more than one container and lid from the starting sheet. Starting sheet 50 can then be severed between the containers and lids in a direction substantially perpendicular to joining strip 56 to provide additional one-piece lidded containers. A domed container made accordance with this embodiment of the invention is shown in FIG. 14.

Alternately, the abutted sheets may be joined by a sealant or in some instances with an adhesive bead as shown in FIG. 15. As shown in FIG. 15, starting sheet 50A is formed from first length 52 juxtaposed with second length 54 with the sealant or adhesive bead 57. A domed container formed from starting sheet 50A folded along bead 57 is shown in FIG. 16.

Figure 17:
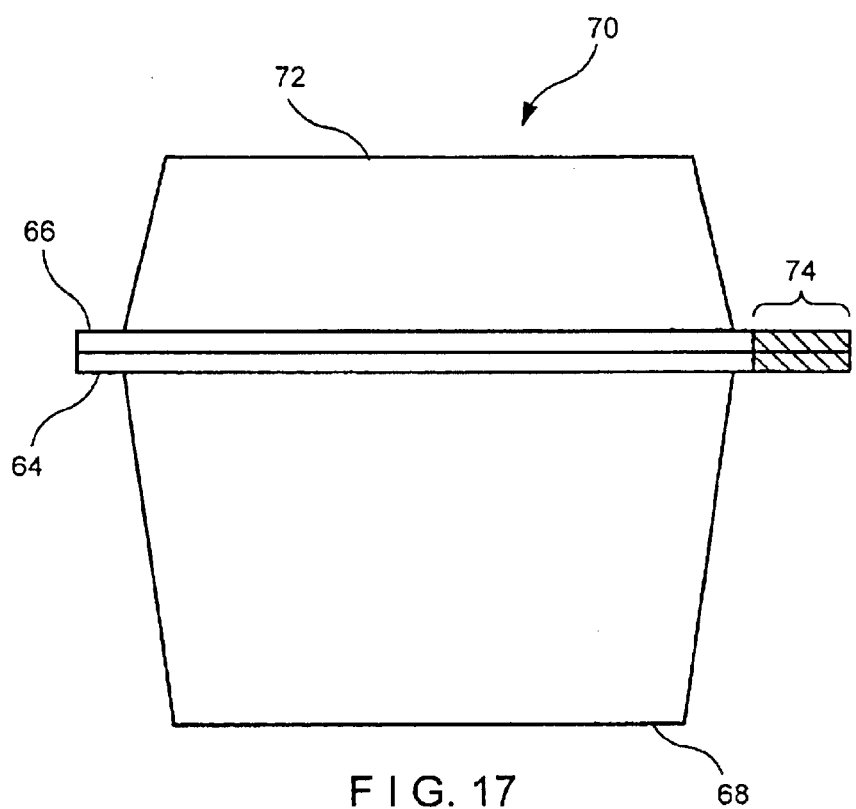
FIG. 17 is a side elevational view of a thermoformed domed container produced in accordance with another alternative embodiment of the present invention.

In another alternative embodiment, one-piece lidded containers are produced by first aligning a container structure having a bottom tray and a corresponding top lid in an axially opposing orientation to provide a closed structure. Thereafter, a contiguous portion of the bottom tray and top lid are lapped (i.e., secured) together either with the use of an adhesive (or sealant) or by sealing as previously described. A one-piece lidded (e.g., domed) container made in accordance with this embodiment of the invention is shown in FIG. 17. As shown in FIG. 17, a closed, one-piece lidded container structure 70 includes a bottom tray 64 and a top lid 66 aligned together in an axially opposing orientation. A contiguous portion of the tray 64 and lid 66 are secured to each other forming lapped juncture 74. The position of lapped juncture 74 is variable since it functions to join the bottom tray and top lid while allowing access to the interior of the containers. In a preferred embodiment, as shown in FIG. 17, lapped juncture 74 is formed at a contiguous portion of tray 64 and lid 66 that omits container structure 68 and dome structure 72.

Advantageously, the present invention facilitates the production of one-piece lidded containers from thermoplastic materials that can be dissimilar in composition, thickness, color, clarity, heat-sealability, barrier characteristics, among other properties. Unwanted waste material can also be minimized through the use of single-layer materials in accordance with the present invention instead of double-layer (i.e., laminated) materials. Thus, through the use of the present invention a variety of combinations for one-piece lidded containers are economically produced.

What is claimed is:

1. A method of making one-piece lidded containers, which comprises: providing a first, a second and a third length of thermoplastic material; positioning a portion of the first and second lengths of thermoplastic material to provide a first juncture of thermoplastic material; positioning a portion of the second and third lengths of thermoplastic material to provide a second juncture of thermoplastic material opposite from the first juncture; securing the thermoplastic material of the first and second junctures; forming at least a first container and at least a second container on the first and third lengths of thermoplastic material; forming at least a first corresponding lid and at least a second corresponding lid on the second length of thermoplastic material; and severing the second length of thermoplastic material between the first and second corresponding lids to provide the one-piece lidded containers.

2. The method of claim 1, wherein the junctures of thermoplastic material are overlaps of thermoplastic material.

3. The method of claim 2, wherein the overlaps of thermoplastic material are positioned between the containers and corresponding lids.

4. The method or claim 2, wherein the overlaps of thermoplastic material are contained within the containers or corresponding lids.

5. The method of claim 1, wherein the junctures of thermoplastic material are juxtapositioned abutments of the first, second, and third lengths of thermoplastic material.

6. The method of claim 5, herein the first, second, and thirds lengths are secured along the abutments.

7. The method of claim 5, wherein the first, second, and third lengths are secured with joining strips in substantially the same direction as and adjacent to the abutments of thermoplastic material.

8. The method of claim 1, wherein the thermoplastic material is selected from the group consisting of oriented thermoplastic materials, non-oriented thermoplastic materials, and combinations thereof.

9. The method of claim 8, wherein the oriented thermoplastic material is oriented polystyrene.

10. The method of claim 8, wherein the non-oriented thermoplastic material is polyethylene terephthalate or polystyrene.

11. The method of claim 1, wherein the corresponding lids are a dome structure.

12. The method of claim 1, wherein the first and second containers are formed at a position other than the first and second junctures.

13. The method of claim 1, wherein the first corresponding lid and the second corresponding lid are formed on the second length of thermoplastic materials at a position other than the first and second junctures.

14. The method of claim 1, wherein the first, second and third lengths of thermoplastic material are each of a single-layer of thermoplastic material.

15. The method of claim 1, wherein the containers and corresponding lids are formed by thermoforming.

16. The method of claim 1, wherein at least one of the lengths of thermoplastic material has different properties.

17. The method of claim 16, wherein one of the different properties is a different color.

18. The method of claim 17, wherein the first and thirds lengths of thermoplastic material are opaque and the second length of thermoplastic material is clear.

19. The method of claim 16, wherein one of the different properties is a differing thickness.

20. The method of claim 16, wherein one of the different properties is differing barrier characteristics.

21. The method of claim 16, wherein one of the different properties is a differing composition.

22. The method of claim 1, wherein the junctures of thermoplastic material are secured by sealing.

23. The method of claim 22, wherein sealing is by ultrasonic welding.

24. The method of claim 1, wherein thermoplastic material is secured with a sealant or an adhesive.

25. The method of claim 24, wherein at least one of the lengths of thermoplastic material has dissimilar properties and the lengths of thermoplastic materials are secured with a sealant or an adhesive compatible therewith.

26. The method of claim 1, wherein the first corresponding lid is positioned proximal to the first container and the second corresponding lid is positioned proximal to the second container.

27. The method of claim 1, which further comprises providing a hinge means between the containers and the corresponding lids.

28. The method of claim 27, wherein the junctures are overlaps of thermoplastic material and the hinge means are provided within the overlaps.

29. The method of claim 27, wherein the thermoplastic material is folded at the overlaps positioned between the containers and the corresponding lids.

30. The method of claim 29, which further comprises scoring the overlaps to facilitate folding of thermoplastic material.

31. The method of claim 1, wherein the hinge means are provided by folding the thermoplastic material at a position between the containers and the corresponding lids in a direction substantially the same as the junctures.

32. The method of claim 1, which further comprises securing fourth and fifth lengths of thermoplastic material to the first and third lengths of thermoplastic material; and forming additional containers and corresponding lids on the lengths of thermoplastic material to provide additional one-piece containers.

33. The method of claim 1, wherein a plurality of containers and a plurality of corresponding lids are formed on the first, second, and third lengths of thermoplastic material.

34. A method of making one-piece lidded containers, which comprises: providing a first, a second and a third length of thermoplastic material; forming at least a first container and at least a second container on the first and third lengths of thermoplastic material; forming at least a first corresponding lid and at least a second corresponding lid on the second length or thermoplastic material; positioning a portion of the first and second lengths of thermoplastic material to provide a first juncture or thermoplastic material and allowing alignment of the first container and the first corresponding lid in an axially opposing orientation; positioning a portion of the second and third lengths of thermoplastic material to provide a second juncture of thermoplastic material opposite from the first juncture and allows alignment of the second container and the second corresponding lid in an axially opposing orientation; securing the thermoplastic material of the-first and second junctures, respectively; and severing the second length of thermoplastic material between the first and second corresponding lid to provide the one-piece lidded containers.

35. The method of claim 34, wherein a plurality of containers and a plurality of corresponding lids are formed on the first, second and third lengths of thermoplastic material.

\* \* \* \* \*

UNITED STATES PATENT AND TRADEMARK OFFICE
CERTIFICATE OF CORRECTION

PATENT NO. : 6,805,659 B2
DATED : October 19, 2004
INVENTOR(S) : Timothy Bohrer

Page 1 of 1

It is certified that error appears in the above-identified patent and that said Letters Patent is hereby corrected as shown below:

Column 10,
Line 33, insert -- wherein -- delete "herein".

Column 12,
Line 34, insert -- A method of making at least one one-piece lidded container, which comprises: providing a first length of thermoplastic material and a second length of thermoplastic material; forming at least a first container and at least a corresponding lid on the first and second lengths of thermoplastic material; positioning a portion of the first and second lengths of thermoplastic material to provide a juncture of thermoplastic material and allowing alignment of the container and corresponding lid to provide closure in an axially opposing orientation; and securing the thermoplastic material at the juncture to form the one-piece lidded container. --.

Signed and Sealed this

Twentieth Day of December, 2005

JON W. DUDAS
*Director of the United States Patent and Trademark Office*